(12) United States Patent
Lomelin-Stoupignan et al.

(10) Patent No.: US 7,487,185 B2
(45) Date of Patent: Feb. 3, 2009

(54) TECHNIQUE FOR CHANGING VIEWS OF WEB CONTENT

(75) Inventors: Mauricio Lomelin-Stoupignan, Seattle, WA (US); Marcelo Aizenstein Furman Calbucci, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 418 days.

(21) Appl. No.: 10/373,363

(22) Filed: Feb. 24, 2003

(65) Prior Publication Data

US 2004/0167933 A1  Aug. 26, 2004

(51) Int. Cl.
*G06F 12/00* (2006.01)
*G06F 17/30* (2006.01)

(52) U.S. Cl. ........................ 707/201; 707/102; 715/234

(58) Field of Classification Search ................ 707/1–10, 707/100–104.1, 200–206; 348/563; 709/217–219; 715/516, 700, 736, 513, 500; 725/9–10, 725/110
See application file for complete search history.

(56) References Cited

U.S. PATENT DOCUMENTS

| | | | | |
|---|---|---|---|---|
| 5,913,215 | A * | 6/1999 | Rubinstein et al. | 707/10 |
| 6,023,701 | A | 2/2000 | Malik et al. | 707/10 |
| 6,025,844 | A * | 2/2000 | Parsons | 715/805 |
| 6,335,737 | B1 | 1/2002 | Grossman et al. | 345/719 |
| 6,526,440 | B1 | 2/2003 | Bharat | 709/219 |
| 6,529,903 | B2 | 3/2003 | Smith et al. | 707/7 |
| 6,615,209 | B1 | 9/2003 | Gomes et al. | 707/5 |
| 6,658,423 | B1 | 12/2003 | Pugh et al. | 707/102 |
| 6,678,681 | B1 | 1/2004 | Brin | 707/6 |
| 6,745,195 | B1 * | 6/2004 | Kornfein et al. | 707/102 |
| 6,898,601 | B2 * | 5/2005 | Amado et al. | 707/10 |
| 6,915,294 | B1 * | 7/2005 | Singh et al. | 707/3 |
| 2002/0059204 | A1 | 5/2002 | Harris | 707/3 |

(Continued)

FOREIGN PATENT DOCUMENTS

JP  2001/195423  7/2001

(Continued)

OTHER PUBLICATIONS

Gewickey et al., A System for providing content-owner control of playback in a network device, Jul. 20, 2001, 1-10.*

(Continued)

*Primary Examiner*—Jean B. Fleurantin
(74) *Attorney, Agent, or Firm*—Woodcock Washburn LLP

(57) ABSTRACT

A system for presenting web content that allows the user to select and change the view of the content. A page of content, which is viewable on a web browser, contains a user-operable element, such as a pull-down menu, that allow the user to select a view for that content. The page is generated in a default view, by using a content-generation program that receives parameters from a first configuration file. The page includes a user-operable element such as a pull-down menu that allows the user to select a different view for the content. The user's selection is transmitted to the content provider. The content provider then re-runs the content-generation program using a second configuration file that corresponds to the selected view. The second configuration file contains different parameters from the first configuration file. The re-generated content is then re-delivered to the user's computer for display on the web browser.

23 Claims, 7 Drawing Sheets

U.S. PATENT DOCUMENTS

| | | | |
|---|---|---|---|
| 2002/0091738 A1* | 7/2002 | Rohrabaugh et al. | 707/517 |
| 2002/0123988 A1 | 9/2002 | Dean et al. | 707/3 |
| 2002/0133481 A1 | 9/2002 | Smith et al. | 707/3 |
| 2004/0143564 A1* | 7/2004 | Gross et al. | 707/1 |

FOREIGN PATENT DOCUMENTS

| | | |
|---|---|---|
| WO | WO 01/25959 | 4/2001 |

OTHER PUBLICATIONS

Allison Woodruff et al., Using Thumbnails to Search the Web, Mar. 2001, ACM, 198-205.*

Nica, A. et al., Using containment information for view evolution in dynamic distributed environments, Aug. 26-28, 1998, IEEE, 212-217.*

Kiyomitsu, H. et al., ActiveWeb: XML-based active rules for Web view derivations and access control, Jan. 29-30, 2001, IEEE, 31-39.*

Brin, S. et al., "The Anatomy of a Large-Scale Hypertextual Web Search Engine", *The Anatomy of a Search Engine*, Aug. 7, 2000, http://www7.scu.edu.au/programme/fullpapers/1921/com1921.htm, 18 pages.

* cited by examiner

TECHNIQUE FOR CHANGING VIEWS OF WEB CONTENT

FIELD OF THE INVENTION

The present invention relates generally to the field of computing. More particularly, the invention provides a technique for allowing a user to change the presentation or "view" of web content.

BACKGROUND OF THE INVENTION

Most web content is generated in real-time by a web server. For example, a search engine server may provide results in response to a search query by locating web pages that relate to the query, generating a page containing those results, and delivering the results page to the user's computer for display on the user's browser.

While the content of the results page is customized based on the user's input (i.e., different queries will generate different results pages), the presentation of the results usually is not customized. Typically, search engines deliver all results in a set format—e.g. a text list containing the titles of the ten results that best match the query—and there is no opportunity for the user to change the format or other aspects of the presentation. Most web sites, such as E-commerce sites, portal sites, etc., suffer from this lack of flexibility in the manner in which content is presented.

Different users may wish to view certain types of content in different ways. For example, some users may prefer the conventional text-only format of search results, while others may prefer each web page listed in a set of search results to be accompanied by a thumbnail image of the page. In some cases, a given user may prefer different presentations depending on what the user is searching for (e.g., the user may care more about thumbnail images when searching for web sites about movies than he does when searching for web sites about ancient Greek literature), or based on some other circumstance (e.g., the user may want to turn off data-intensive thumbnail images when accessing the Internet via a slow dial-up line). Conventional web sites, however, do not allow the user to change back and forth between different presentations or "views" of content.

In view of the foregoing, there is a need for a system that overcomes the drawbacks of the prior art.

SUMMARY OF THE INVENTION

The present invention allows a user who is viewing content with a web browser to alternate among different views for that content. A page of content comes with a user-operable control, such as a pull-down menu, that gives the user a selection of different views. The user selects the view, and the user's selection is then transmitted back to the content provider. The content provider then re-generates the page of content to reflect the view that the user has selected, and re-transmits the content to the user's computer for viewing on the web browser.

For example, the user may be using a search engine, and may be presented with results in a traditional form—i.e., a list of web page titles for the ten pages that best match the user's query, followed by a one- or two-sentence description of each page. This form may be a first "view." The results page may include a pull-down menu whereby the user can select a different view—e.g., a "preview images" view where each web page title in the results is accompanied by a thumbnail image of that web page. If the user selects this second view, the user's selection is transmitted back to the search engine, which re-generates the results page in the second view. The re-generated results page is then transmitted the user's computer for viewing on the browser.

In one embodiment of the invention, a page of content can be generated by a computer program that can receive parameters as input in order to alter the nature of the content that it generates. These parameters can be stored in a configuration file. The parameters to cause the program to generate one view can be stored in one configuration file, and the parameters that cause the program to generate another view can be stored in another configuration file. Thus, changing views can be implemented by changing the configuration file from which the content-generation program takes its input parameters.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Typically, web content can be customized based on user input, but the presentation of that content is not customized. For example, a search engine can prepare a page of results in response to a query; the content of the page is specifically prepared to respond to a particular query, but the results are generally in a set format—e.g., a text list of web page titles and descriptions. The present invention allows a user to select a different presentation or "view" of web content. Thus, for example, a user could select to receive search results either as a text list, or as a set of thumbnail images of web pages, or could change back and forth between these two presentations.

Exemplary Computing Environment

Figure 1:
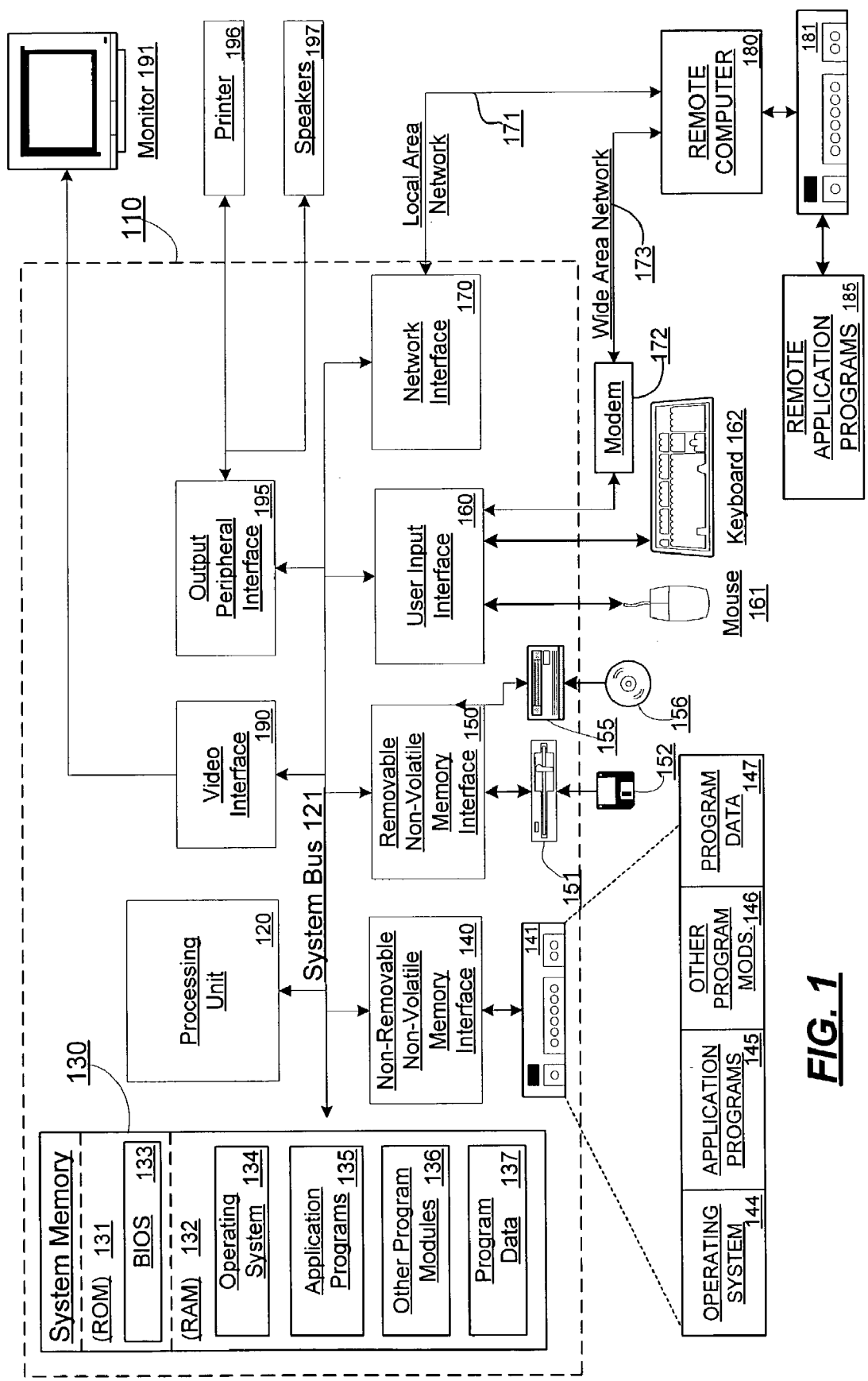
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Web Browser

Figure 2:
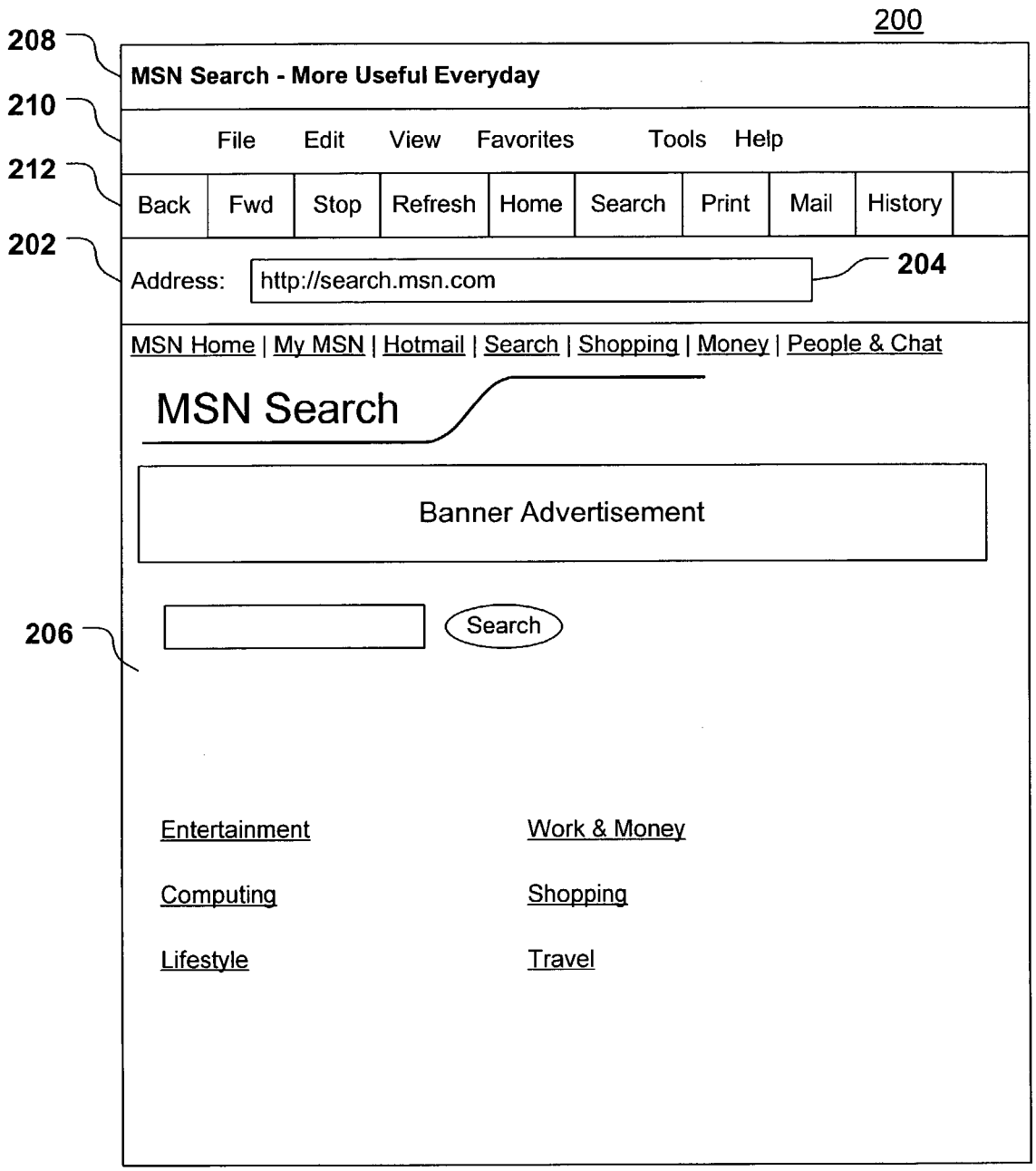
FIG. 2 is a block diagram of the user interface of an exemplary web browser.

FIG. 2 shows the visual interface of an exemplary web browser 200. As is known in the art, a web browser is a piece of software that allows a user to interact with certain types of content (e.g., Hypertext Markup Language ("HTML") or eXtensible Hypertext Markup Language ("XHTML") content), and to retrieve such content from a network. Browser 200 may, for example, constitute software that is stored on computer 110 (shown in FIG. 1), and that executes on processing unit 120 (shown in FIG. 1). Browser 200 may access content from a wide area network 173 (shown in FIG. 1), such as the Internet, to which computer 110 is connected. Typically, browser 200 is also able to access content that is stored locally on computer 110.

The exemplary browser of FIG. 2 displays various information to the user. In particular, browser 200 displays a navigation bar 202 to the user. Navigation bar 202 includes a box 204, into which a user may enter a Uniform Resource Locator (URL), into order to point the browser to a particular content item. In the example of FIG. 2, the user has entered the URL http://search.msn.com into box 204, thereby indicating that the user wishes to access the content identified by that URL. Browser 200 retrieves this content from wherever on the Internet it may be located, and displays the content in viewing area 206. In the example of FIG. 2, the content is delivered in HTML or XHTML. (The phrase "http" in the URL stands for "Hypertext Transfer Protocol; it's presence in a URL indicates that the underlying content is HTML or XHTML content.) Browser 200 contains, or otherwise accesses, an HTML and/or XHTML interpreter that renders the HTML or XHTML content received by browser 200. In the example of FIG. 2, browser 200 displays the title of the content ("MSN Search—More Useful Everyday") in title bar 208.

A typical browser, such as browser 200, also allows the user to perform various functions, such as: printing, mailing, or saving the displayed content; using a list of "favorites" or "bookmarks" to navigate to other content; changing the default font for text content, etc. This functionality is exposed to the user by means of menu bar 210 and/or buttons 212.

As discussed below, the invention provides a technique for allowing the user to select the presentation or "view" of the content that is displayed to the user in viewing area 206.

Using Executable Code to Generate Content

Some web content is static—that is, some web content is simply a file of HTML content that is stored in a file system and does not change (or is edited only infrequently by its owner). However, most commercial web content is generated dynamically at the time it is delivered to the user. This dynamically generated content either reflects some level of personalization for the user, or is generated in response to some input from the user. For example, when a user visits an E-commerce site, that site's server may generate a "welcome" page that greets the user by name and contains sales targeted toward that user's purchasing habits. As another example, a search engine may receive a query from a user and may generate a page of search results that are responsive to the query. Commercial content providers operate computer programs that generate this content at the time it is delivered to the user.

Figure 3:
FIG. 3 is a block diagram of a first exemplary code module that produces web content.
Figure 4:
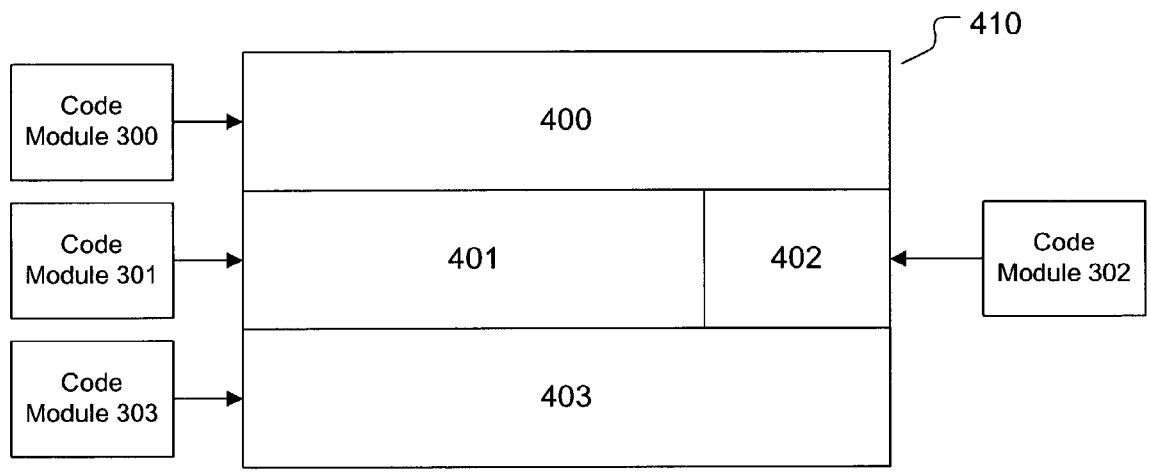
FIG. 4 is a block diagram of an exemplary content layout having plural regions, with content-producing modules being bound to the regions.

FIG. 3 shows an example of a content-generation program Code module 300 is an executable or interpretable computer program. When code module 300 runs, it produces content that is suitable for viewing on a web browser, such as HTML content 302. Code module 300 can be embodied as any type of program, such as executable code that is executable directly on a microprocessor (such as processing unit 120, shown in FIG. 1), or interpretable code (such as a C# script, Java bytecode, etc.) that can be executed with the aid of a script engine or virtual machine interpreter. It should be noted that a given piece of content, such as an HTML web page, need not be produced by a single code module, but rather may be produced by several code modules. FIG. 4 shows an example where a web page 410 is divided into four regions 400, 401, 402, and 403. Each of these regions is bound to a different code module that produces content for its corresponding region. Thus, code modules 300, 301, 302, and 303 are bound to regions 400, 401, 402, and 403, respectively. Region 400 is filled with content produced by code module 300; region 401 is filled with content produced by code module 401; and so on.

Figure 5:
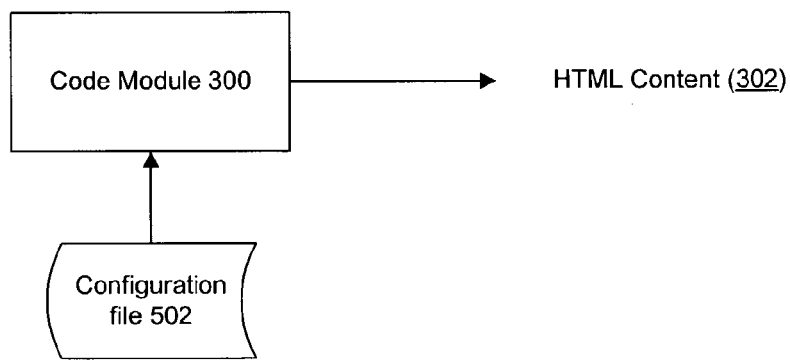
FIG. 5 is a block diagram of the exemplary code module of FIG. 3, producing web content based on a configuration file.

Like other programs, a code module, such as code module 300, is capable of having its behavior affected by its input. Thus, code module 300 can vary the substance of content 302 based on the input to code module 300. FIG. 5 shows code module 300 receiving input from a "configuration file" 502. The substance of the content 302 that code module 300 produces is based, at least in part, on the input contained in configuration file 502. For example, configuration file 502 may contain parameters that specify the content 302's color, layout, font, sort order, etc. Thus, the nature of content 302 can be changed by changing which parameters are stored in configuration file 502. Alternative versions of configuration file 502 can be stored, and code module 300 can be induced to generate a certain type of content by selecting a particular one of these alternative configuration files to be used as code module 300's input.

Figure 6:
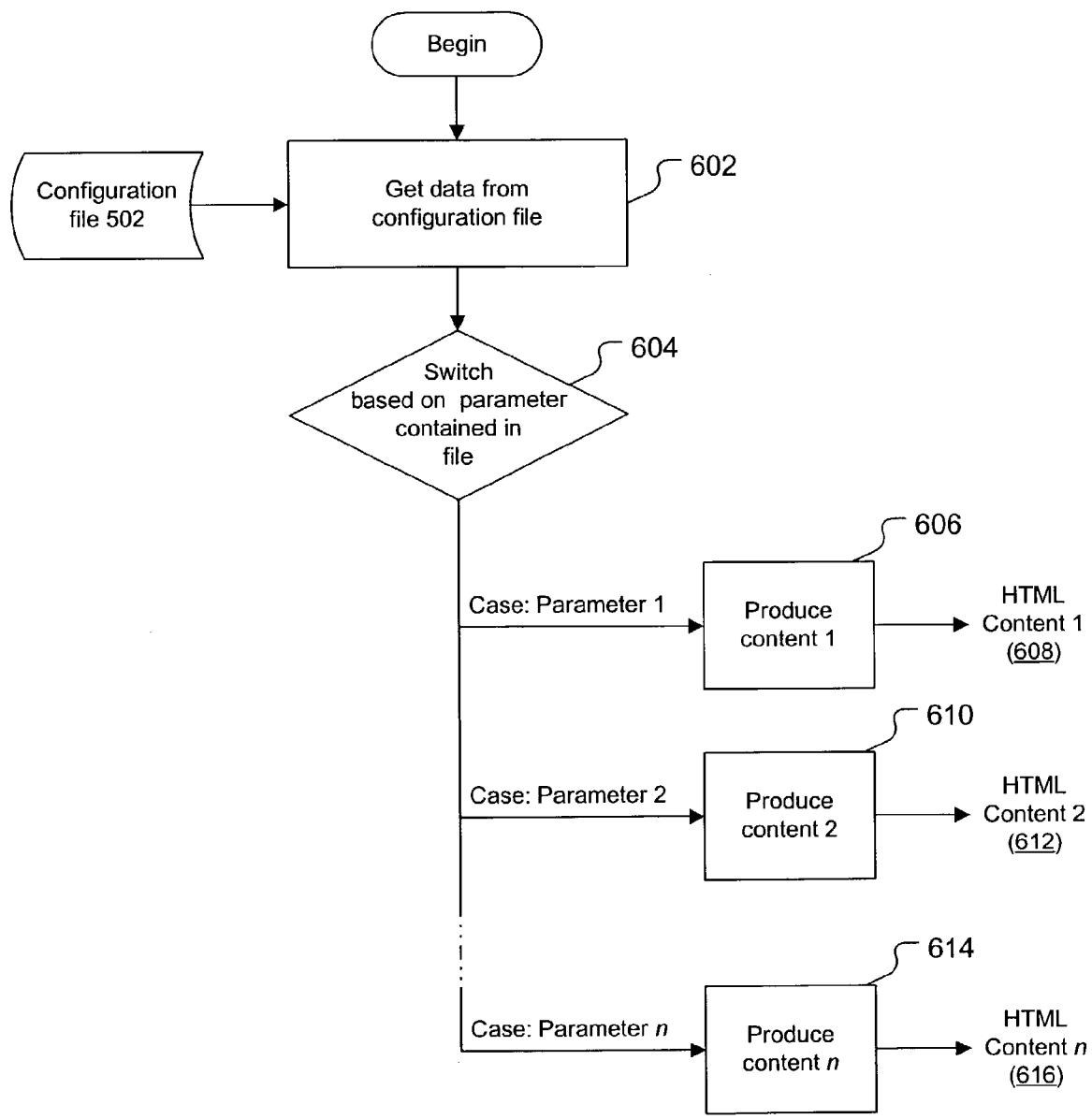
FIG. 6 is a flow diagram of a process carried out by the exemplary code module shown in FIG. 5.

A benefit of code module 300's ability to modify its runtime behavior based on its input is that the same code module 300 can be used to generate different content (or different variations on the same underlying content). FIG. 6 shows an example of the logic that a code module 300 could implement in order to generate different types of content based on a configuration file. FIG. 6 shows a specific example where the parameter(s) in configuration file 502 specify n discrete different types of content, although it should be understood that there are even more flexible examples of the use of a parameter.

At step 602, code module 300 receives input data from configuration file 502. This input data contains one or more parameters that affect which content code module 300 will produce. At step 604, an n-way switch is performed based on which parameter is received. For example, configuration file 502 contains parameters 1, then code module 300 produces HTML content 608 (block 606). If configuration file 502 contains parameter 2, then code module 300 produces HTML content 612 (block 610). An arbitrary number of different parameters may be handled in this way, all the way up to parameter n; if parameter n is received, then code module 300 produces HTML content 616 (block 614).

It should be appreciated that the parameters contained in configuration file 502 need not direct code module 300 to select among n discrete content choices, but rather may affect the nature of code module 300's output in any manner. For example, the parameters may make specify height and width for the content, a font, an angle through which to rotate the content, the number of graphical images to be included in the content, etc.

Offering Alternative Views or Presentations of Content

As discussed above, it is possible to generate different versions of a piece of content by providing different parameters to the program that generates the content. It is thus possible to give the user a choice as to how the user would like a given piece of content to be presented. For example, a user who performs a web search using a search engine can be given the choice to have the results presented with, or without, thumbnail images of the web pages identified in the results.

Figure 7:
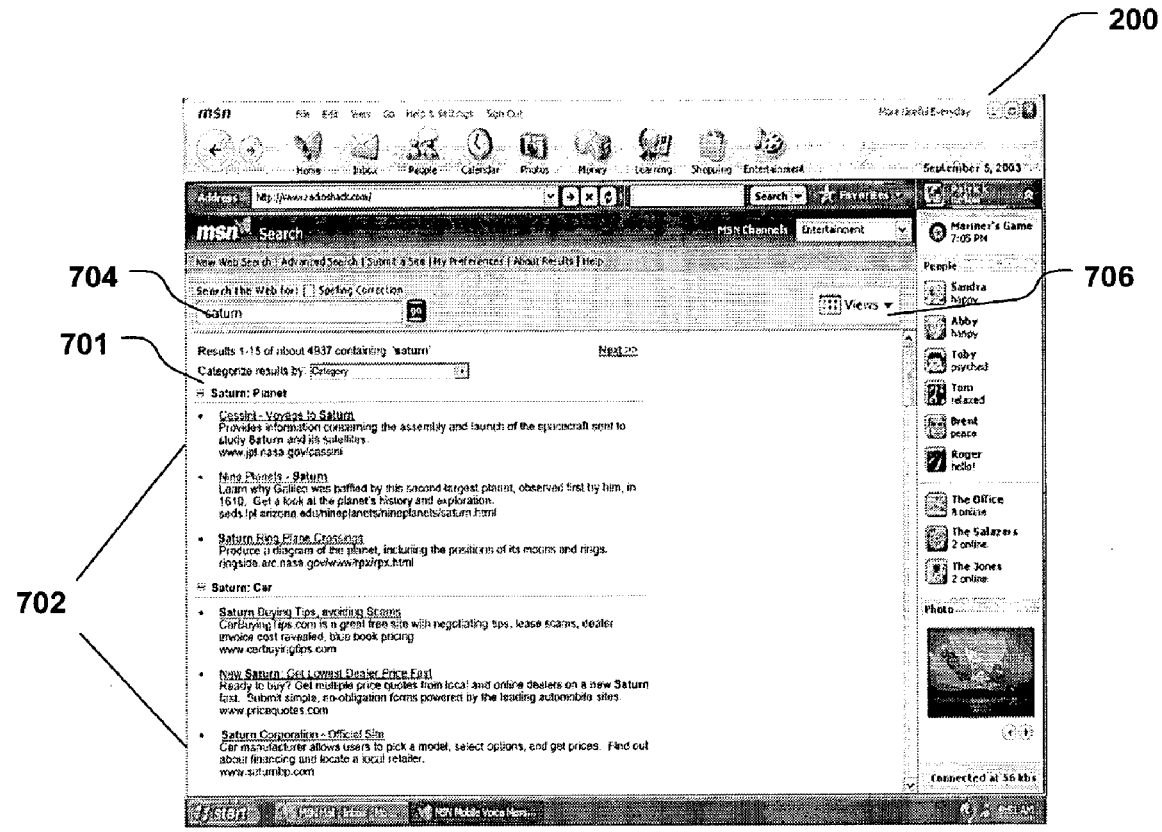
FIG. 7 is a block diagram of a first exemplary view or presentation in accordance with aspects of the invention.

FIG. 7 shows an exemplary user interface that allows a user to select how content is to be viewed. FIG. 7 shows browser 200 displaying a page 701 of results provided by a search engine. In the example of FIG. 7, the user has performed a search based on the query "saturn" (as indicated by query box 704). The results include a list 702 of web sites. Each item in list 702 shows a title and description of a web site that was located by the search engine. It can be appreciated from the preceding discussion page 701 was generated by a program, such as code module 300. For example, code module 300 may receive, from a search engine's "back end," raw data about web pages that are responsive to the "saturn" query; code module 300 may then generate a web page 701 that presents this raw data as a list of web page titles and descriptions.

Figure 8:
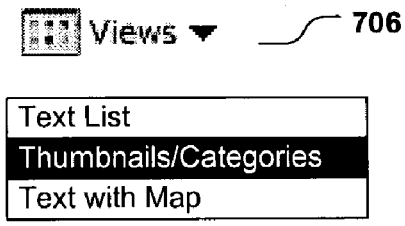
FIG. 8 is a block diagram of a user-operable element for selecting a view in accordance with aspects of the invention.
Figure 9:
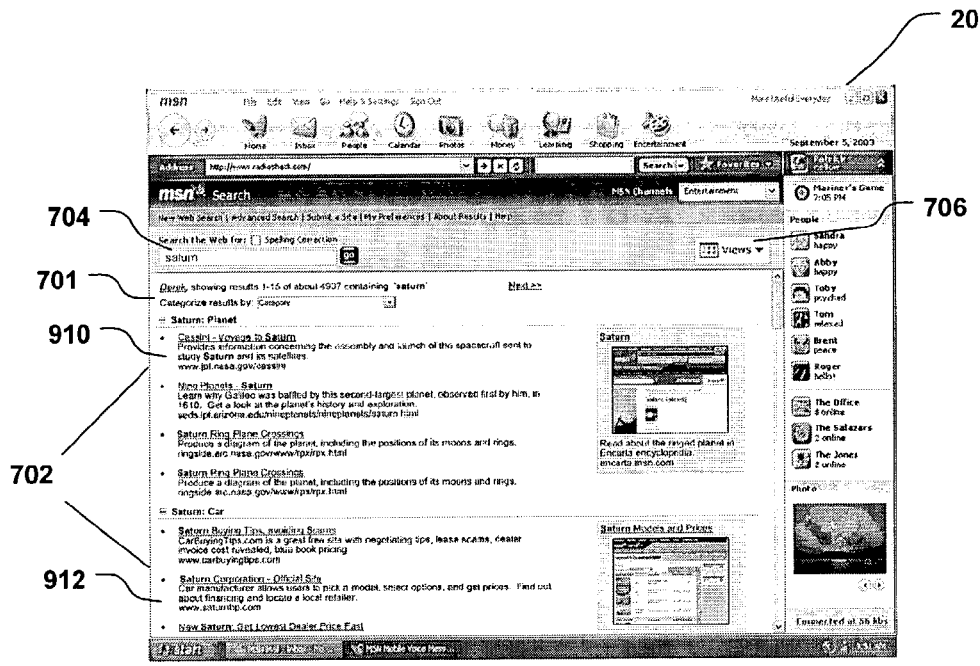
FIG. 9 is a block diagram of a second exemplary view or presentation in accordance with aspects of the invention.

Page 701 contains a pull-down menu 706, that allows the user to select an alternative view for the search results. For example, menu 706 may list various view choices, such as those shown in FIG. 8. As indicated by the highlighted selection in FIG. 8, the current view is "Text List." If the user wishes to see the results in a different view, the user can select a different choice from menu 706, such as "Thumbnails/ Categories." If the user selects this view, the user's selection is transmitted back to the search engine, which can re-render the results in a different view. FIG. 9 shows what happens when the results of FIG. 7 are rendered in a different view. A new page 901 is delivered to browser 200, which displays information on the query "saturn." However, page 901 now shows the results being divided into categories of information on Saturn the planet (reference numeral 910) and information on Saturn the brand of car (reference numeral 912). Additionally, page 901 shows thumbnail images 920, 922 for the top results in each of the categories.

It will be appreciated that the search engine that provides search results is able to change the view shown in FIG. 7 to the view shown in FIG. 9 by running the a single generating program using two different configuration files. For example, code module 300 (shown in FIG. 3) may be a program that receives raw data about web pages that are responsive to the "saturn" query, and that generates a results page based on that raw data. Code module 300 may also receive data from configuration file 502 indicating which view code module 300 should use to present the search results. Thus, a search engine can change the view of search results simply by re-running the program that generates the results with a different configuration file, and delivering the page containing the re-generated results to the user's browser.

Figure 10:
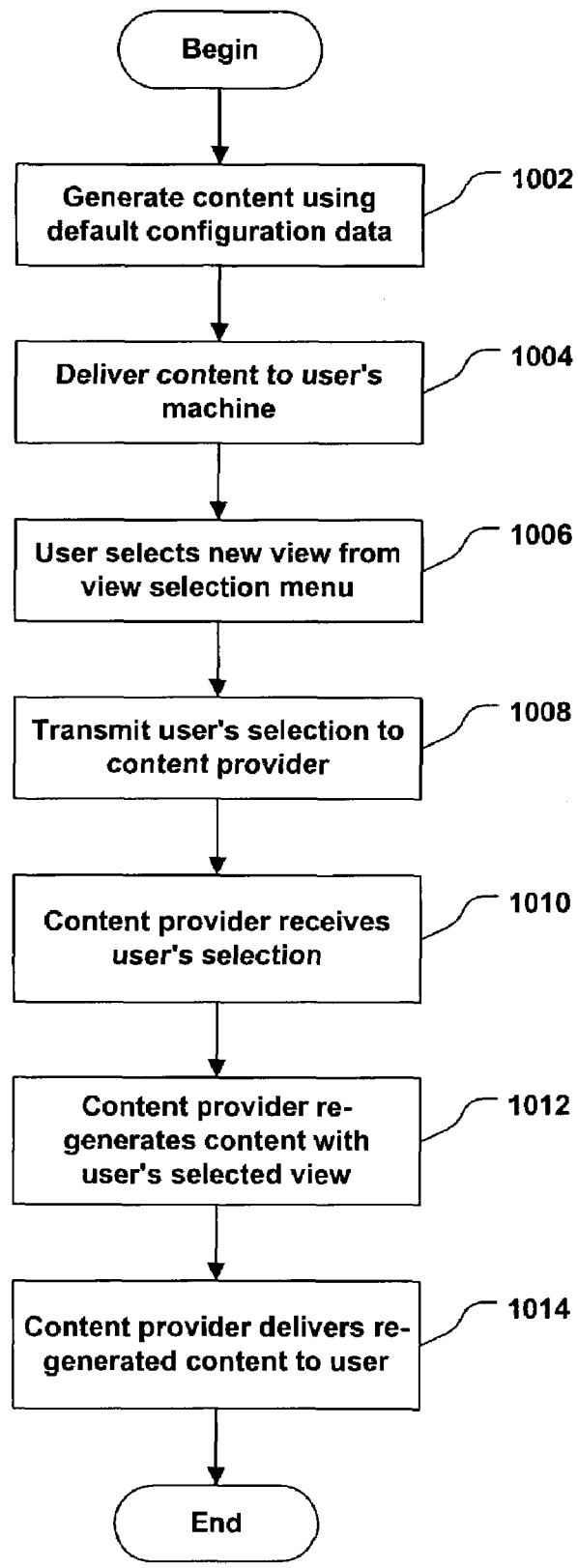
FIG. 10 is a flow diagram of an exemplary process for allowing a user to select a view in accordance with aspects of the invention.

FIG. 10 shows, in the form of a flow chart, the process of delivering content in one view, and then re-delivering it in another view according to a user selection. Initially, the program that generates content (e.g., code module 300) is run in order to generate material that is viewable on a web browser (block 1002). Typically, this program is run on a content server, such as the front-end of a search engine. The program is run using a default configuration file. Thus, the program receives a default set of parameters and renders the content in a default view. After a page containing the content has been generated, the page is delivered to the user's machine for rendering on the user's browser (block 1004).

While the user is viewing the content on the browser, the user may select a different view—e.g., by using pull-down menu 706 (shown in FIG. 7), which is part of the page of content (block 1006). The user's new view selection is transmitted to the content server (block 1008). The content server receives this selection (block 1010), and re-generates the content based on the user's view selection (block 1012). In a preferred embodiment, this re-generation can be performed by re-running the same content-generation program that was run at block 1002, but with a different configuration file. As previously described, this different configuration file contains different parameters than the default configuration file, so that the content-generation program will produce different content in response to these different parameters.

After the content has been re-generated with a different configuration file, the re-generated content is re-delivered to the user's machine (block 1014), and re-displayed on the user's browser.

Figure 11:
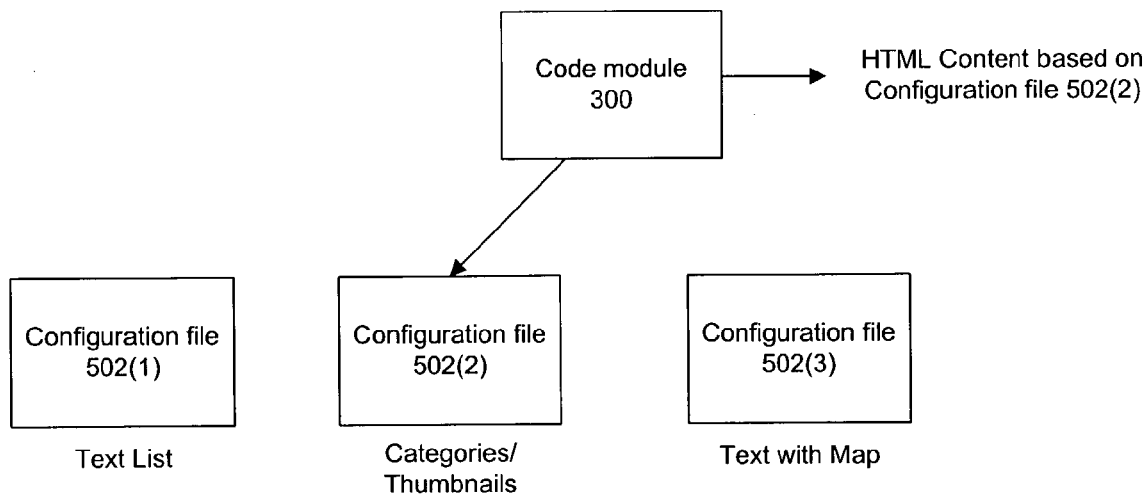
FIG. 11 is a block diagram of an exemplary structure that uses different configuration files to change views in accordance with aspects of the invention.

FIG. 11 shows how the content-generating program (code module 300) can use different configuration files based on which view is selected. Configuration file 501(1) corresponds to the view that was called "Text List" in FIG. 8; configuration file 501(2) corresponds to the view called "Categories/ Thumbnails"; and configuration file 501(3) corresponds to the view called "Text with Maps." Configuration files 501(1) through 501(3) are all stored on the machine on which code module 300 runs. However code module 300 only uses one of these files, at a given time, as a source of parameters. In the example of FIG. 11, code module 300 is generating content based on the user's selection of "Categories/Thumbnails" as the view, so code module 300 uses configuration file 502(2) as a source of parameters. Configuration file 502(2), in this example, contains the parameters that cause code module 300 to generate content in the form shown in FIG. 9.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A computer-implemented method of offering plural content views to a user comprising:
   running a program to generate an item of content in a first view, wherein said item of content comprises at least one of: text and graphics;
   transmitting said item of content for display on a user's machine, said item of content including a user-operable element that allows said user to select from a plurality of views;
   receiving, from said user, a selection of a second view different from said first view; and
   re-running the program to generate said item of content in said second view,
   wherein a first set of input parameters generated in response to input from the user corresponds to said first view, wherein a second set of input parameters generated in response to input from the user corresponds to said second view, and wherein said program generates said item of content in said first view or said second view according to whether said program receives as input said first set of input parameters or said second set of input parameters, and
   wherein said first set of input parameters is stored in a first configuration file, wherein said second set of input parameters is stored in a second configuration file, wherein said program is caused to generate said content item in said first view by directing said content program to receive input from said first configuration file, and wherein said program is caused to generate said content item in said second view by directing said content program to receive input from said second configuration file.

2. The computer-implemented method of claim 1, wherein said item of content in said first view comprises an Hypertext Markup Language(HTML) web page.

3. The computer-implemented method of claim 1, wherein said item of content comprises a plurality of web pages responsive to a search query.

4. The computer-implemented method of claim 3, wherein said item of content in said first view comprises information relating to a first set of said plurality of web pages, and wherein said item of content in said second view comprises information relating to a second set of said plurality of web pages, said second set not being identical to said first set.

5. The computer-implemented method of claim 1, wherein the item of content in each of said first and second views comprises a Hypertext Markup Language (HTML) web page.

6. The computer-implemented method of claim 1, wherein the item of content comprises results that are responsive to a search query, wherein the first and second views comprise information based on said results, said first and second views not being identical to each other.

7. The computer-implemented method of claim 6, wherein said results comprise information relating to a plurality of web pages, wherein said first view comprises information relating to a first set of said plurality of web pages, wherein said second view comprises information relating to a second set of said plurality of web pages, said first set and said second set not being identical to each other.

8. The computer-implemented method of claim 1, wherein said item of content comprises results responsive to a query.

9. The computer-implemented method of claim 8, wherein said item of content in said first view comprises first information about said results, and wherein said item of content in said second view comprises second information about said results, said second information not being identical to said first information.

10. The computer-implemented method of claim 9, wherein said first information comprises titles of at least some of the results, and wherein said second information comprises graphics relating to at least some of the results.

11. The computer-implemented method of claim 9, wherein said first information is based on a first set of said results, wherein said second information is based on a second set of said results, and wherein said first set is not identical to said second set.

12. The computer-implemented method of claim 1, wherein said user operable element comprises a view-change menu, and wherein said selection of said second view different from said first view is received from said user via said view-change menu.

13. The computer-implemented method of claim 12, wherein said item of content in said second view includes another view-change menu.

14. A computer-readable storage medium on which computer-executable instructions are stored, the computer-executable instructions, when executed on a computer, causing the computer to perform a method of allowing a user to change content views, the method comprising:
   running a program to generate an item of content in a first view, wherein said item of content comprises at least one of: text and graphics;
   transmitting said item of content for display on a user's machine, said item of content including a user-operable element that allows said user to select from a plurality of views;
   receiving, from said user, a selection of a second view different from said first view; and
   re-running the program to generate said item of content in said second view,
   wherein a first set of input parameters generated in response to input from the user corresponds to said first view, wherein a second set of input parameters generated in response to input from the user corresponds to said second view, and wherein said program generates said item of content in said first view or said second view according to whether said program receives as input said first set of input parameters or said second set of input parameters, and
   wherein said first set of input parameters is stored in a first configuration file, wherein said second set of input parameters is stored in a second configuration file, wherein said program is caused to generate said content item in said first view by directing said content program to receive input from said first configuration file, and wherein said program is caused to generate said content item in said second view by directing said content program to receive input from said second configuration file.

15. The computer-readable storage medium of claim 14, wherein said item of content in said first view comprises a Hypertext Markup Language (HTML) web page.

16. The computer-readable storage medium of claim 14, wherein said item of content comprises a plurality of web pages responsive to a search query.

17. The computer-readable storage medium of claim 16, wherein said item of content in said first view comprises information relating to a first set of said plurality of web pages, and wherein said item of content in said second view comprises information relating to a second set of said plurality of web pages, said second set not being identical to said first set.

18. The computer-readable storage medium of claim 14, wherein said item of content comprises results responsive to a query.

19. The computer-readable storage medium of claim 18, wherein said item of content in said first view comprises first information about said results, and wherein said item of content in said second view comprises second information about said results, said second information not being identical to said first information.

20. The computer-readable storage medium of claim 19, wherein said first information comprises titles of at least some of the results, and wherein said second information comprises graphics relating to at least some of the results.

21. The computer-readable storage medium of claim 19, wherein said first information is based on a first set of said results, wherein said second information is based on a second set of said results, and wherein said first set is not identical to said second set.

22. The computer-readable storage medium of claim 14, wherein said user operable element comprises a view-change menu, and wherein said selection of said second view different from said first view is received from said user via said view-change menu.

23. The computer-readable storage medium of claim 22, wherein said item of content in said second view includes another view-change menu.

\* \* \* \* \*